Sept. 1, 1959   RYOICHI SAKURAI ET AL   2,902,335
SYNTHETIC FIBER PREPARATION
Filed Aug. 16, 1955   2 Sheets-Sheet 1
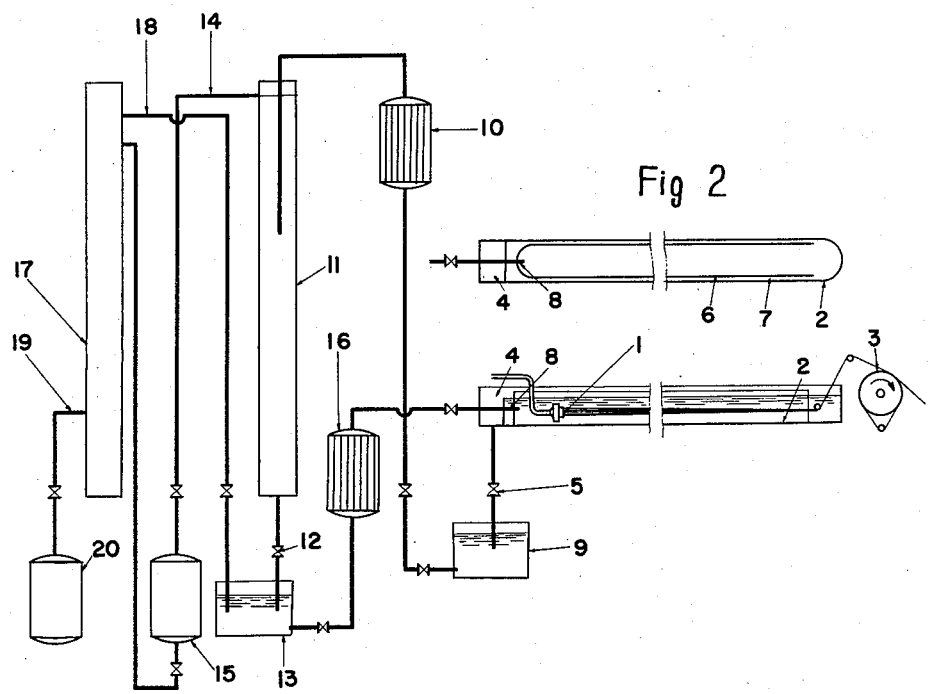
INVENTORS
RYOICHI SAKURAI
TAKASHI TANABE
HIDEO NAGAO
BY
*Kenyon & Kenyon*
ATTORNEYS

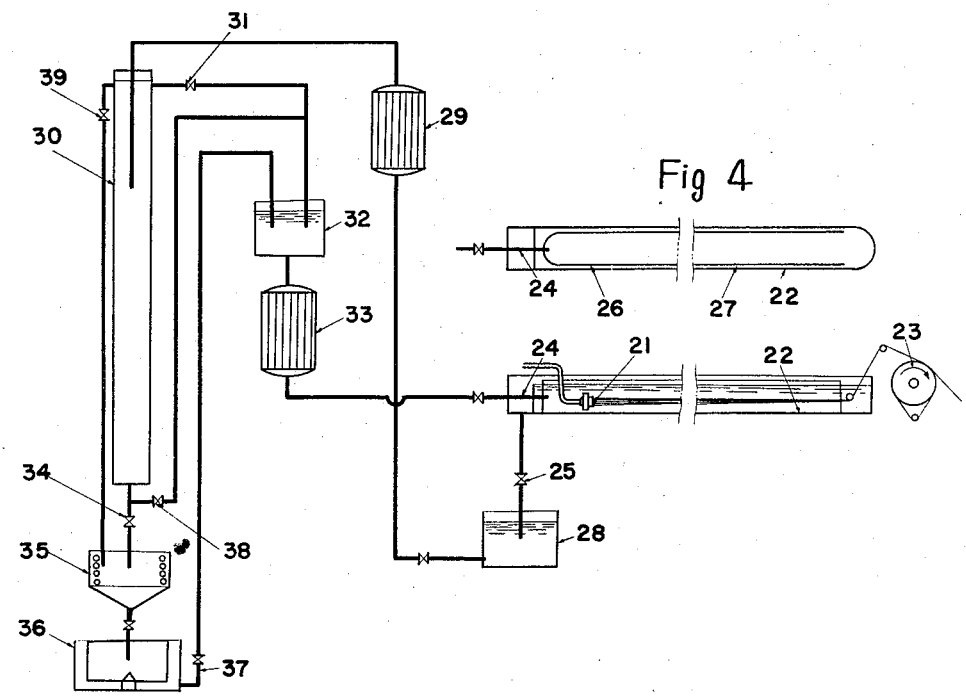

United States Patent Office

2,902,335
Patented Sept. 1, 1959

2,902,335

SYNTHETIC FIBER PREPARATION

Ryoichi Sakurai, Kyoto, and Takashi Tanabe and Hideo Nagao, Iwakunishi, Japan

Application August 16, 1955, Serial No. 528,735

3 Claims. (Cl. 18—54)

This invention relates to a new method of production of synthetic fiber from acrylic nitrile polymers by wet spinning.

It has heretofore been found that the methods of production of synthetic fiber from acrylic nitrile polymers by wet spinning are concerned mostly with a spinning process and have difficulty or disadvantage in recovering the solvent for commerical purpose.

According to the present invention it has been found that solubility equilibrium between some concentrated aqueous solution of inorganic salts and organic solvent having affinity to water may be considerably changed depending upon the variation of concentration and temperature of the aqueous solution of salts and that the organic solvent is separated at every temperature from the aqueous solution of salts the concentration of which is higher than a given concentration. This invention aims at producing improved fiber and at the same time recovering the solvent more easily by utilizing these properties.

For this purpose, dimethylformamide, dimethylsulfoxide or ethylenecarbonate has been added respectively to the various concentration aqueous solutions of inorganic or organic acid salts of metals belonging to 1, 2, 3 and 4 groups of periodic arrangement and the solubility equilibrium at different temperature between aqueous solutions of salts and solvents has been examined. In many cases when solvents have been added to the aqueous salt solution, salts have been precipitated or homogeneous solutions have been obtained and the solvents have not been separated into two phases, but when an aqueous solution of potassium carbonate has been used, dimethylformamide, dimethylsulfoxide and ethylenecarbonate has been separated. When an aqueous solution of ammonium sulphate has been used, ethylenecarbonate has been separated.

Table 1 illustrates the relation between the solvent and the aqueous solution of salts depending upon the variation of concentration and temperature of the solution made by the mixture of dimethylformamide and aqueous solution of potassium carbonate.

Table 2 illustrates the same relation in case of the mixture of dimethylsulfoxide and aqueous solution of potassium carbonate.

Table 3 illustrates the same relation in case of the mixture of ethylenecarbonate and aqueous solution of potassium carbonate.

Table 4 illustrates the same relation in case of the mixture of ethylenecarbonate and aqueous solution of ammonium sulphate.

In these experiments, 20% by volume of the solvent was added to 80% by volume of these aqueous solutions and the equilibrium condition between each of the solvents and each of aqueous solutions at 0°–100° C. was observed.

In case of dimethylformamide and dimethylsulfoxide, the said solvent would be separated in an upper layer, while in case of ethylenecarbonate it would be be separated in a lower layer except a more than 40% by weight aqueous solution of potassium carbonate.

TABLE 1.—DIMETHYLFORMAMIDE-POTASSIUM CARBONATE SYSTEM

| Concentration of $K_2CO_3$ aqueous solution, percent by weight | Separating temperature of dimethylformamide, °C. | Concentration of Separated Dimethylformamide, percent by weight | Possible temperature for Spinning, °C. |
|---|---|---|---|
| 20 | 0– 72 | 28 | 0–100 |
| 30 | 0– 87 | 42 | 0–100 |
| 40 | 0–100 | 56 | 0–100 |
| 50 | 0–100 | 69 | 0–100 |
| 55 | ¹ 40–100 | 77 | 40–100 |

¹ Below 40° C., $K_2CO_3$ crystallize out.

TABLE 2.—DIMETHYLSULFOXIDE-POTASSIUM CARBONATE SYSTEM

| Concentration of $K_2CO_3$ aqueous solution, percent by weight | Separating temperature of Dimethylsulfoxide, °C. | Concentration of Separated Dimethylsulfoxide, percent by weight | Possible temperature for Spinning, °C. |
|---|---|---|---|
| 20 | 0– 75 | 34 | 0–100 |
| 30 | 0–100 | 40 | 0–100 |
| 40 | 0–100 | 45 | 0–100 |
| 50 | 0–100 | 52 | 0–100 |
| 55 | ¹ 40–100 | 54 | 40–100 |

¹ Below 40° C., $K_2CO_3$ crystallize out.

TABLE 3.—ETHYLENECARBONATE-POTASSIUM CARBONATE SYSTEM

| Concentration of $K_2CO_3$ aqueous solution, percent by weight | Separating temperature of Ethylenecarbonate, °C. | Concentration of Separated Ethylenecarbonate, percent by weight | Possible temperature for Spinning, °C. |
|---|---|---|---|
| 20 | 20– 45 | 78 | 30–100 |
| 30 | 20– 64 | 80 | 30–100 |
| 40 | 25–100 | 83 | 30–100 |
| 50 | 25–100 | 85 | 30–100 |
| 55 | ¹ 40–100 | 86 | 40–100 |

¹ Below 40° C., $K_2CO_3$ crystallize out.

TABLE 4.—ETHYLENECARBONATE-AMMONIUM SULPHATE SYSTEM

| Concentration of $(NH_4)_2SO_4$ aqueous solution, percent by weight | Separating temperature of Ethylenecarbonate, °C. | Concentration of Separated Ethylenecarbonate, percent by weight | Possible temperature for Spinning, °C. |
|---|---|---|---|
| 15 | 15– 30 | 77 | 30–100 |
| 20 | 25– 67 | 79 | 30–100 |
| 30 | 25– 94 | 82 | 30–100 |
| 40 | 25–100 | 84 | 30–100 |
| 45 | 30–100 | 86 | 30–100 |

As this experiment is the observation of the equilibrium relationship between the solvents, dimethylformamide, dimethylsulfoxide, ethylenecarbonate and aqueous solutions of inorganic or organic acid salts, potassium carbonate and ammonium sulphate at the temperature from 0° C. to 100° C., it is difficult to extrude the solution at lower than 30° C. according to its melting point in case of ethylenecarbonate, but in case of dimethylformamide and dimethylsulfoxide, it is possible to extrude the solution even at the wide range of temperatures beyond the spinning temperatures shown in the above tables.

In any other concentration of aqueous solution of salts which is not shown in the above tables or in the concentration below 20% of potassium carbonate and 15% of ammonium sulphate, dimethylformamide, dimethylsulfoxide and ethylenecarbonate cannot be separated, but some kinds of polymers can be easily spun in this condition. Furthermore, it is difficult to extrude the solution in the concentrations of potassium carbonate solution of more than 55% concentration or the ammonium sulphate solution of more than 45% concentration because the salts are in supersaturation.

As shown in the above experiments and the following examples, 20–55% by weight aqueous solution of potassium carbonate can be used when dimethylformamide or dimethylsulfoxide is used as a solvent for acrylic nitrile polymers and 20–55% by weight aqueous solution of potassium carbonate or 10–45% by weight aqueous solution of ammonium sulphate can be used when ethylenecarbonate is used.

The process of this invention is to produce fiber in the same way as the conventional process, by extruding the solution of acrylic nitrile polymers into the coagulating bath comprising an aqueous solution of potassium carbonate or ammonium sulphate. The solvent will be separated according to that the concentration becomes higher in the coagulating solution. This coagulating solution will be circulated to the separating tower after cooling if necessary, or directly without cooling, where the solvent will be separated into two phases of solvent and coagulating solution. Thus the solvent will be recovered and used continually, leaving the coagulating solution to circulate into the coagulating bath. This process utilizing the equilibrium condition among polymer solution, coagulating solution and solvent as above mentioned, is to produce improved fiber and at the same time to recover the solvent.

In this process, improved fiber can be much easily produced, by changing the concentration and temperature of the coagulating solution according to the concentration of the polymer solution and the kinds of acrylic nitrile polymers. For example, in case of acrylonitrile-vinylpyridine copolymer having high coagulating speed, the concentration of aqueous solution of salts will be increased and its temperature will be lowered, and in case of acrylonitrile-acrylamide copolymer having low coagulating speed, the concentration of aqueous solution of salts will be lowered and its temperature will be increased.

As polymer which can be used in this invention, all polymers which are soluble in dimethylformamide, dimethylsulfoxide and ethylenecarbonate can be used and especially among them, acrylic nitrile polymers are the most suitable. The acrylic nitrile polymers include polyacrylonitrile, acrylonitrile copolymers and all their blends. The comonomers which are copolymerized with acrylic nitrile, are as follows: vinylacetate, vinylformate, vinylchloride, vinylidenechloride, vinylidenecyanide, methacrylonitrile, acrylic acid and its esters, methacrylic acid and its esters, acrylamide, allylalcohol, methallylalcohol, mono- and dialkyl-acrylamide, allylamine, vinylpyridine and its derivatives, vinylcarbazol and its derivatives, vinylchloro-acetate, vinylphthalimide, vinylamine-derivatives, vinylpyrol, vinylindol and its derivatives, vinylpyrolidin, vinylpiperidin, vinylsuccimide, vinylglutarimide, vinyldiglycolylimide, vinylpyrolidon and its derivatives, vinyl-ε-caprolactam, vinyltrimethylammoniumchloride, vinylquinoline and its derivatives, vinylpyrazine, vinylpiperizine and its derivatives, vinylimidazol and its derivatives, vinylpyrazoline, vinyloxazol, vinyltriazol, etc.

For the concentration of aqueous solution of salts, the range of 20–55% by weight of potassium carbonate and 10–45% by weight of ammonium sulphate is the most suitable, but the wider range of concentration can be used with some kinds of polymers, and the concentration will be decided by the composition of polymer and the concentration of solution.

The temperature of coagulating bath is ordinarily 0–80° C. for the solvent of dimethylformamide or dimethylsulfoxide and 30–100° C. for ethylenecarbonate, but the temperature beyond these ranges can be used with some kinds of polymers.

The present invention will be now illustrated with reference to the embodiments diagrammatically shown in the annexed drawings in which Fig. 1 is a diagrammatic view of an embodiment for carrying out the fiber preparing process of this invention in which dimethylformamide or dimethylsulfoxide is used as a solvent for polymer.

Fig. 2 is a plan view of the coagulating bath used in the embodiment shown in Fig. 1.

Fig. 3 is a diagrammatic view of an embodiment for carrying out the fiber preparing process of this invention in which ethylenecarbonate is used as a solvent for acrylic nitrile polymers and ammonium sulphate as a coagulating bath.

Fig. 4 is a plan view of the coagulating bath used in the embodiment shown in Fig. 3.

In the drawings, Figs. 1 and 2, the solution of an acrylic nitrile polymer in dimethylformamide is extruded into the coagulating bath 2 comprising an aqueous solution of potassium carbonate through the spinneret 1 to form filaments and these filaments are wound on a goddet roller 3 and transferred to the next process where they are subjected to the drawing and heat-treatment. Thus fiber is produced.

On the other hand, the aqueous solution of potassium carbonate is continually poured into the coagulating bath through the inlet 8 and flows in the direction of extrusion towards the end of the bath where it turns back through the return course 7 divided by the partition 6 towards the overflow 4 and it flows out through the outlet 5 into the tank 9 and stored up there for a while. Then it is pumped up to the cooler 10 where it is cooled down to a given temperature, usually —5–40° C. and driven into the separating tower 11. In this tower, dimethylformamide is separated in the upper layer above the solution of potassium carbonate and this water-containing dimethylformamide is overflowed from the outlet 14 into a tank 15 where it is stored up.

Because of the said dimethylformamide would contain 70–15% water, it is sent to a continuous distilling tower 17 where it is purified and the purified dimethylformamide is taken off from the outlet 19 and is stored up in a tank 20 to be used again. The diluted aqueous solution of dimethylformamide which has a lower boiling point is led through the outlet 18 at the top of the tower into a bath 13 for adjusting the concentration of aqueous potassium carbonate solution. On the other hand, the aqueous potassium carbonate solution from which crude dimethylformamide has been separated in the separating tower 11 is taken off through the valve 12 into aforesaid bath 13 where changes in concentration of potassium carbonate solution resulting from changes in water content adsorped by amide solution may be adjusted by mixing the diluted dimethylformamide solution coming from the distilling tower and furthermore the loss of the coagulating solution is replenished there. The said adjusted potassium carbonate solution is heated at a given temperature, usually to 0–80° C. in the heater 16 and then it is continually poured into the coagulating bath 2 through the inlet 8. In this continuous operation, filaments cannot only be continuously produced but also the solvent can be recovered easily and economically. When dimethylsulfoxide is used as a solvent, fiber preparation and the solvent recovery can be done in the same way as mentioned above.

When ethylenecarbonate is used as a solvent, the process in principle is the same as the above, but because this solvent is crystalline at about 38° C., the equipment in recovery process is different from the above.

In Figs. 3 and 4 showing this modified process, the solution of polymer in ethylenecarbonate is extruded through the spinneret 21 to form filaments into coagulating bath comprising an aqueous solution of ammonium sulphate. These filaments, after taking up on the goddet roller 23, are sent to the next process where they are subjected to the drawing and heat-treatment.

On the other hand, the aqueous solution of ammonium sulphate is poured continually through the inlet 24 into the coagulating bath 22 and flowed in the direction of extrusion towards the end of the bath where it turns back through the return course 27 separated by the partition 26 towards the other end and it flows out through the outlet 25 into a tank 28 where it is stored up for a while. And then it is sent by the pump to the cooler 29 where it is cooled down to a given temperature, usually 10–40° C. and it is sent into the separating tower 30.

In the separating tower, ethylenecarbonate, which comes out from the coagulating bath 22 is separated in the lower layer. This separated ethylenecarbonate, after taking off from the outlet 34, is sent to the cooling tank 35 where it is cooled and most of ethylenecarbonate is crystallized. Then it is sent to the centrifugal machine 36 to separate and recover nearly purified crystal of ethylenecarbonate. The diluted aqueous solution of ethylenecarbonate which has been separated in the centrifugal machine, is sent through the pipe 37 into a bath 32 for adjusting the concentration of aqueous ammonium sulphate solution.

On the other hand, the ammonium sulphate solution from which ethylenecarbonate has been separated in the separating tower, is taken off from the outlet 31 at the upper part and sent to the bath 32. In this bath changes in concentration of ammonium sulphate solution resulting from changes in water content passed to the lower ethylenecarbonate solution is adjusted by mixing the diluted ethylenecarbonate solution coming from the distilling tower and at the same time the loss of the coagulating solution is replenished.

The said adjusted ammonium sulphate solution is heated to a given temperature, usually to 30–100° C. in a heater 33 and poured continually through the inlet 24 into the coagulating bath 22.

In this continuous operation, filaments cannot only be continuously produced but also solvent can be easily recovered.

The above explanation is based on the case that ethylenecarbonate is used as a solvent for polymer and ammonium sulphate solution as the coagulating solution. It is the same when potassium carbonate solution is used as the coagulating solution.

In this case, however, if a more than 40% aqueous solution of potassium carbonate is used as the coagulating solution, the ethylenecarbonate will be separated as the upper layer in the separating tower, so that it must be taken off from the outlet 39 and sent to the cooling tank 35 to be recovered. On the other hand, the aqueous solution of potassium carbonate must be taken off from the outlet 38 and sent to the concentration adjusting bath 32.

Fig. 1 and Fig. 3 are flow charts showing the outline of this invention, but on the actual operation of extrusion, two to five successive coagulating baths would be available for producing improved filaments and at the same time recovering the solvent more economically and furthermore a squeezing roller would be equipped to each of baths to obtain more satisfactory results.

It has been described how to produce filaments and at the same time to recover the solvent by the continuous operation. The present invention may be accomplished without circulation of the coagulating solution. Further the recovery of the solvent is not always an essential matter in this invention.

This invention will be more fully described by the following examples, although it is understood that the invention is not intended to be limited by these examples.

In these examples, the specific viscosity is described by $\eta_{sp}$ and the concentration is described by percent parts by weight.

For dimethylformamide, $$\eta_{sp} = \frac{\text{Viscosity of Dimethylformamide solution (1 g./l.)}}{\text{Viscosity of Dimethylformamide}} - 1$$

Example 1

A spinning solution was prepared by dissolving 17 parts polyacrylonitrile ($\eta_{sp}$ 0.26) in 83 parts dimethylformamide and filtering the solution under pressure. This solution was extruded through a spinneret having 20 holes, each 0.1 mm. in diameter, into a coagulating bath comprising 35% potassium carbonate solution at 40° C. The filaments were wound on a goddet roller at the speed of 30 m./min. After washing and drying, they were drawn to five times of length in glycerine at 150° C. The filaments thus produced have a dry strength of 4.31 g./de. and a dry elongation at break of 23.4%.

Example 2

A spinning solution was prepared by dissolving 16 parts copolymer ($\eta_{sp}$ 0.31) of 92% acrylonitrile and 8% acrylamide in 84 parts dimethylformamide. This solution was extruded through a spinneret having 20 holes, each 0.1 mm. in diameter, into a coagulating bath comprising 20% aqueous solution of potassium carbonate at 70° C. The filaments were wound on a goddet roller at the speed of 30 m./min. After washing and drying, they were drawn to five times of length in glycerine at 140° C. The filaments thus produced have a dry strength of 3.81 g./de. and a dry elongation at break of 25.5%.

Example 3

A spinning solution was prepared by dissolving 16 parts copolymer ($\eta_{sp}$ 0.28) of 93% acrylonitrile and 7% vinylphthalimide in 84 parts dimethylformamide. This solution was extruded through a spinneret having 50 holes, each 0.08 mm. in diameter, into a coagulating bath comprising 40% aqueous solution of potassium carbonate cooled down to 5° C. The filaments were wound on a goddet roller at the speed of 30 m./min. After washing and drying, they are drawn to six times of length in glycerine at 140° C. The filaments thus produced have a dry strength of 4.42 g./de. and a dry elongation at break of 21.2%.

Example 4

85 parts copolymer ($\eta_{sp}$ 0.27) of 98% acrylonitrile and 2% vinylacetate and 15 parts copolymer ($\eta_{sp}$ 0.24) of 60% acrylonitrile and 40% 2-ethyl 5-vinylpyridine were blended to obtain a blended polymer. A spinning solution was prepared by dissolving 18 parts this blended polymer in 82 parts dimethylformamide. This solution was extruded through a spinneret having 40 holes, each 0.10 mm. in diameter, into a coagulating bath comprising 50% aqueous solution of potassium carbonate at 20° C. The filaments were wound on a goddet roller at the speed of 30 m./min. and after washing and drying they were drawn to six times of length in glycerine at 150° C. The filaments thus produced have a dry strength of 4.21 g./de. and a dry elongation at break of 23.1%.

Example 5

A spinning solution was prepared by dissolving 17 parts copolymer ($\eta_{sp}$ 0.26) of 97% acrylonitrile and 3% methylmethacrylate in 83 parts ethylenecarbonate at the temperature of 80° C. This solution was extruded through a spinneret having 50 holes, each 0.10 mm. in diameter, into a coagulating bath comprising 25% aqueous solution of potassium carbonate at 80° C. The filaments were wound on a goddet roller at the speed of 30 m./min. and after washing and drying they were drawn to five times of length in glycerine at 150° C. The filaments thus produced have a dry strength of 4.52 g./de. and a dry elongation at break of 23.6%.

Example 6

50 parts copolymer ($\eta_{sp}$. 0.24) of 85% acrylonitrile and 15% vinylcarbazol and 50 parts copolymer ($\eta_{sp}$. 0.28) of 95% acrylonitrile and 5% methylacrylate were blended to obtain a blended polymer. A spinning solution was prepared by dissolving 15 parts this blended polymer in 85 parts ethylenecarbonate at the temperature of 80° C. This solution was extruded through a spinneret with 20 holes, each 0.08 mm. in diameter, into a coagulating bath comprising 45% aqueous solution of potassium carbonate at 40° C. The filaments were wound on a goddet roller at the speed of 30 m./min. and after washing and drying they were drawn to six times of length in glycerine at 150° C. The filaments thus produced have a dry strength of 3.56 g./de. and a dry elongation at break of 23.1%.

Example 7

A spinning solution was prepared by dissolving 17 parts copolymer ($\eta_{sp}$. 0.28) of 97% acrylonitrile and 3% methacrylic acid in 83 parts ethylenecarbonate at the temperature of 80° C. This solution was extruded through a spinneret having 40 holes, each 0.10 mm. in diameter, into a coagulating bath comprising 20% aqueous solution of ammonium sulphate at 90° C. The filaments were wound on a goddet roller at the speed of 30 m./min. and after washing and drying they were drawn to five times of length in glycerine at 145° C. The filaments thus produced have a dry strength of 4.42 g./de. and a dry elongation at break of 18.5%.

Example 8

A spinning solution was prepared by dissolving 15 parts copolymer ($\eta_{sp}$. 0.27) of 93% acrylonitrile and 7% vinylchloroacetate in 85 parts ethylenecarbonate at the temperature of 80° C. This solution was extruded through a spinneret having 20 holes, each 0.12 mm. in diameter, into a coagulating bath comprising 40% aqueous solution of ammonium sulphate at 45° C. The filaments were wound on a goddet roller at the speed of 30 m./min. and after washing and drying they were drawn to six times of length in glycerine at 140° C. The filaments thus produced have a dry strength of 4.53 g./de. and a dry elongation at break of 21.7%.

Example 9

A spinning solution was prepared by dissolving 18 parts a copolymer ($\eta_{sp}$. 0.25) of 98% acrylonitrile and 2% methylacrylate in 82 parts dimethylsulfoxide at 70° C. This solution was extruded through a spinneret having 40 holes, each 0.1 mm. in diameter, into a coagulating bath comprising 50% aqueous solution of potassium carbonate. The filaments were wound on a goddet roller at the speed of 30 m./min. and after washing and drying they were drawn to five times of length in glycerine at 150° C. The filaments thus produced have a dry strength of 4.52 g./de. and a dry elongation at break of 23.6%.

Example 10

A spinning solution was prepared by dissolving 19 parts a copolymer ($\eta_{sp}$. 0.24) of 90% acrylonitrile and 10% vinylphthalimide in 81 parts dimethylsulfoxide. This solution was extruded through a spinneret having 40 holes, each 0.1 mm. in diameter, into a coagulating bath comprising 25% aqueous solution of potassium carbonate at 10° C. The filaments were wound on a goddet roller at the speed of 30 m./min. and after washing and drying they were drawn to six times of length in glycerine at 140° C. The filaments thus produced had a dry strength of 3.92 g./de. and a dry elongation at break of 21.0%.

Example 11

A spinning solution was prepared by dissolving 20.5 kgr. a copolymer ($\eta_{sp}$. 0.25) of 95% acrylonitrile and 5% N.N-dimethylacrylamide in 100 kgr. dimethylformamide. This solution was extruded at the speed of 60 cc./mm. through a spinneret having 300 holes, each 0.1 mm. in diameter, into a coagulating bath comprising 25% aqueous solution of potassium carbonate at 60° C. in the process shown in Fig. 1. This aqueous solution of potassium carbonate was adjusted with its concentration in the concentration adjusting bath and heated to 60° C. and then it was poured continually at the speed of 3.0 l./min. into a coagulating bath. Dimethylformamide coming out from the polymer solution into the coagulating bath was continually taken off together with aqueous solution of potassium carbonate from the outlet and the solution was cooled to 5° C. in the cooler and then sent to the separating tower, where the dimethylformamide was separated in the upper layer from the solution of potassium carbonate as a 36% aqueous solution at the average rate of 135 cc./min. This solution of dimethylformamide was sent to the continuous distilling tower where pure dimethylformamide was recovered. The aqueous solution of potassium carbonate separated in the lower layer was sent from the outlet to the concentration adjusting bath, where the loss of water of this solution which had been taken off with the dimethylformamide was replenished by adding a low boiling point fraction, that is the diluted, about 0.5%, aqueous solution of dimethylformamide coming from the upper part of the distilling tower at the average speed of 85 cc./min. Thus the concentration of the aqueous solution of potassium carbonate was adjusted. This solution was heated to 60° C. in the heater and was sent to the coagulating bath to be used again. In the above continuous practice, improved filaments could be obtained. The balance of the dimethylformamide in the recovering process was as follows:

The quantity of the aqueous solution of dimethylformamide taken off from the separating tower _____ kgr__ 261.0
The quantity of pure dimethylformamide distilled in the continuous distilling tower _____ kgr__ 96.5
The quantity of low boiling point fraction, that is the diluted aqueous solution of dimethylformamide, coming from the upper part of the distilling tower _____ kgr__ 164.0
The recovery percentage of dimethylformamide in this process _____ percent__ 96.5

Example 12

A spinning solution was prepared by dissolving 23.5 kgr. a copolymer ($\eta_{sp}$. 0.25) of 95% acrylonitrile and 5% methallyl alcohol in 100 kgr. dimethylformamide. In the process shown in Fig. 1, this solution was extruded through a spinneret having 300 holes, each 0.1 mm. in diameter, at the speed of 60 cc./min. into a coagulating bath comprising 45% aqueous solution of potassium carbonate at 20° C. This aqueous solution of potassium carbonate was sent from the concentration adjusting bath to the heater where it was warmed to 20° C. and then poured continually into the coagulating bath at the speed of 5.0 l./min.

The dimethylformamide coming out from the polymer solution into the coagulating bath was taken off continually together with an aqueous solution of potassium carbonate from the outlet and the solution was cooled to 10° C. in the cooler and then sent to the separating tower, where the dimethylformamide was separated in the upper layer from the solution of potassium carbonate as a 62% aqueous solution at the average rate of 82 cc./min. This solution in dimethylformamide was sent to the continuous distilling tower to recover pure dimethylformamide.

The aqueous solution of potassium carbonate separated in the lower layer was sent from the outlet to the concentration adjusting bath, where the loss of water of this solution which had been taken off with the dimethylformamide was replenished by adding the diluted, about 0.5%, aqueous solution of dimethylformamide coming from the upper part of the distilling tower at the average speed of 32 cc./min. Thus the concentration of the aqueous solution of potassium carbonate was adjusted. This solution was warmed to 20° C. in the heater and poured into a coagulating bath to be used again. In the above continuous practice, the improved filaments could be obtained. The balance of the dimethylformamide in the recovering process was as follows:

| | |
|---|---:|
| The quantity of the aqueous solution of dimethylformamide taken off from the separating tower kgr__ | 157.0 |
| The quantity of pure dimethylformamide distilled in the continuous distilling tower _____kgr__ | 97.2 |
| The quantity of low boiling point fraction, that is the diluted aqueous solution of dimethylformamide coming from the upper part of the distilling tower _____kgr__ | 59.0 |
| The recovery percentage of dimethylformamide in this process _____percent__ | 97.2 |

*Example 13*

A spinning solution was prepared by dissolving 19.0 kgr. a copolymer ($\eta_{sp}$ 0.27) of 97% acrylonitrile and 3% methacrylic acid in 100 kgr. ethylenecarbonate at 80° C. In the process shown in Fig. 3, this solution was extruded at the speed of 60 cc./min. through a spinneret with 300 holes, each 0.12 mm. in diameter, into a coagulating bath comprising 40% aqueous solution of ammonium sulphate at 80° C.

The ethylenecarbonate coming out from the polymer solution into the coagulating bath was continually taken off together with an aqueous solution of ammonium sulphate from the outlet, and the solution was cooled to 40° C. in the cooler and sent to the separating tower where ethylenecarbonate was separated in the lower layer at the average rate of 57 cc./min. from the solution of ammonium sulphate as a 85% aqueous solution. This solution was sent to the cooling tank where it was cooled to 5° C. so that most of ethylenecarbonate was crystallized, and then was sent to the centrifugal machine to recover purified ethylenecarbonate. On the other hand, the aqueous solution of ammonium sulphate separated in the upper layer was sent from the outlet to the concentration adjusting bath where the loss of water of this solution which had been taken off with the ethylenecarbonate was replenished by adding the diluted aqueous solution of ethylenecarbonate coming from the centrifugal machine at the average rate of 11 cc./min. Thus the concentration of the solution of ammonium sulphate was adjusted. This solution was heated to 80° C. in the heater and then poured continually at the speed of 3.0 l./min. into the coagulating bath to be used again. The balance of the ethylenecarbonate in the recovering process was as follows:

| | |
|---|---:|
| The quantity of the aqueous solution of ethylenecarbonate taken off from the separating tower kgr__ | 114.0 |
| The quantity of the ethylenecarbonate recovered in the centrifugal machine _____kgr__ | 96.2 |
| The quantity of the diluted aqueous solution of ethylenecarbonate separated in the centrifugal machine _____kgr__ | 17.5 |
| The recovery percentage of ethylenecarbonate in this process _____percent__ | 96.2 |

*Example 14*

A spinning solution was prepared by dissolving 19.0 kgr. a copolymer ($\eta_{sp}$ 0.25) of 97% acrylonitrile and 3% vinylchloride in 100 kgr. ethylenecarbonate at 80° C.

In the process shown in Fig. 3, this solution was extruded through a spinneret having 300 holes, each 0.1 mm. in diameter, at the speed of 60 cc./min. into a coagulating bath comprising 20% aqueous solution of ammonium sulphate at 40° C. The ethylenecarbonate coming out from the polymer solution into the coagulating bath was taken off continually together with an aqueous solution of ammonium sulphate from the outlet and the solution was cooled to 25° C. in the cooler and sent to the separating tower where ethylenecarbonate was separated in the lower layer at the average rate of 61 cc./min. from the solution of ammonium sulphate as a 80% aqueous solution. The solution was sent to a cooling tank where it was cooled to 0° C. so that most of ethylenecarbonate was crystallized and then was sent to the centrifugal machine to recover purified ethylenecarbonate.

On the other hand, the aqueous solution of ammonium sulphate separated in the upper layer was sent from the outlet at the top of the separating tower to the concentration adjusting bath where the loss of water of this solution which had been taken off with the ethylenecarbonate was replenished by adding the diluted aqueous solution of ethylenecarbonate coming from the centrifugal machine at the average rate of 15 cc./min. Thus the concentration of the solution of ammonium sulphate was adjusted.

This solution heated to 40° C. in the heater and then poured into the coagulating bath to be used again.

The balance of the ethylenecarbonate in the recovering process was as follows:

| | |
|---|---:|
| The quantity of the aqueous solution of ethylenecarbonate which was taken off from the separating tower _____kgr__ | 120.0 |
| The quantity of the ethylenecarbonate recovered in the centrifugal machine _____kgr__ | 95.4 |
| The quantity of the diluted aqueous solution of ethylenecarbonate separated in the centrifugal machine _____kgr__ | 24.0 |
| The recovery percentage of ethylenecarbonate in this process _____percent__ | 95.4 |

*Example 15*

A spinning solution was prepared by dissolving 22.0 kgr. a copolymer ($\eta_{sp}$ 0.24) of 93% acrylonitrile and 7% acrylamide in 100 kgr. ethylenecarbonate at 80° C. This solution was extruded through a spinneret having 300 holes, each 0.1 mm. in diameter, at the speed of 60 cc./min. into a coagulating bath comprising 25% aqueous solution of potassium carbonate at 60° C. as shown in Fig. 3.

The ethylenecarbonate coming out from the polymer solution into the coagulating bath was taken off continually together with an aqueous solution of potassium carbonate was cooled to 25° C. in the cooler and sent to the separating tower where the ethylenecarbonate was separated in the lower layer at the average rate of 60 cc./min. as an about 80% aqueous solution. This solution was sent to a cooling tank where it was cooled to 0° C. so that most of ethylenecarbonate was crystallized and then was sent to the centrifugal machine to recover purified ethylenecarbonate.

On the other hand, the aqueous solution of potassium carbonate separated in the upper layer was sent from the outlet to the concentration adjusting bath where the loss of water of this solution which had been taken off with the ethylenecarbonate was replenished by adding the diluted aqueous solution of ethylenecarbonate coming from the centrifugal machine at the average rate of 15.0 cc./min. Thus the concentration of the solution of potassium carbonate was adjusted.

This solution was heated to 60° C. in the heater and then poured continually into the bath to be used again.

The balance of the ethylenecarbonate in the recovering process was as follows:

| | |
|---|---|
| The quantity of the aqueous solution of ethylenecarbonate taken off from the separating tower _____kgr__ | 120.0 |
| The quantity of the ethylenecarbonate recovered in the centrifugal machine _____kgr__ | 95.8 |
| The quantity of the diluted aqueous solution of ethylenecarbonate separated in the centrifugal machine _____kgr__ | 23.7 |
| The recovery percentage of ethylenecarbonate in this process _____percent__ | 95.8 |

*Example 16*

A spinning solution was prepared by dissolving 22 kgr. polyacrylonitrile ($\eta_{sp}$. 0.25) in 100 kgr. dimethylsulfoxide at 80° C. This solution was extruded at the speed of 60 cc./min. through a spinneret having 300 holes, each 0.12 mm. in diameter, into a coagulating bath comprising 30% aqueous solution of potassium carbonate at 40° C. in the process shown as Fig. 1.

The dimethylsulfoxide coming out from the polymer solution into the coagulating bath was taken off continually together with an aqueous solution of potassium carbonate from the outlet and the solution was cooled to 10° C. in the cooler and sent to the separating tower where the dimethylsulfoxide was separated in the upper layer as a 40% aqueous solution at the average rate of 121 cc./min. This solution was sent to the continuous distilling tower to recover purified dimethylsulfoxide. On the other hand, the aqueous solution of potassium carbonate separated in the lower layer was sent from the outlet to the concentration adjusting bath where the loss of water of this solution which had been taken off with the dimethylsulfoxide was replenished by adding the diluted aqueous solution of dimethylsulfoxide coming from the upper part of the continuous distilling tower at the rate of 72.0 cc./min. Thus the concentration of the solution of potassium carbonate was adjusted. This solution was heated to 40° C. in the heater and then poured into the coagulating bath to be used again.

The balance of the dimethylsulfoxide in the recovering process was as follows:

| | |
|---|---|
| The quantity of the aqueous solution of dimethylsulfoxide taken off from the separating tower _____kgr__ | 238.0 |
| The quantity of the dimethylsulfoxide recovered in the continuous distilling tower _____kgr__ | 94.8 |
| The quantity of low boiling point fraction, that is the diluted aqueous solution of dimethylsulfoxide distilled in the continuous distilling tower _____kgr__ | 143 |
| The recovery percentage of dimethylsulfoxide in this process _____percent__ | 94.8 |

What we claim is:

1. A process for wet spinning of acrylic nitrile synthetic fiber which comprises extruding a solution prepared by dissolving acrylic nitrile polymers in dimethylformamide, into a 20 to 55% by weight aqueous solution of potassium carbonate, cooling the aqueous solution of dimethylformamide and potassium carbonate to form two phases, one phase being rich in dimethylformamide and the other phase being rich in potassium carbonate, and reusing the potassium carbonate phase in the extrusion of the acrylic nitrile polymer.

2. A process for wet spinning of acrylic nitrile synthetic fiber which comprises extruding a solution prepared by dissolving acrylic nitrile polymers in dimethylformamide, into a 20 to 55% by weight aqueous solution of potassium carbonate, cooling the aqueous solution of dimethylformamide and potassium carbonate to produce two phases, one phase being rich in dimethylformamide and the other phase being rich in potassium carbonate, subjecting the dimethylformamide phase to a treatment for the separation of water therefrom, combining the separated water with the potassium carbonate rich phase and reusing the recovered aqueous solution of potassium carbonate for extrusion of the acrylic nitrile polymer.

3. A process which comprises extruding a solution of acrylic nitrile polymer and dimethylformamide into an aqueous solution of about 20 to 55% potassium carbonate in an extrusion zone at a temperature of about 0 to 80° C. to form a filament of the polymer and produce an aqueous solution of dimethylformamide and potassium carbonate, cooling the resultant solution to a temperature of about −5 to 40° C. and thus forming a dimethylformamide-water phase and a potassium carbonate-water phase, separating the said phases, subjecting the formamide-water phase to treatment to produce a formamide rich fraction and a water rich fraction, adjusting the potassium carbonate concentration of the potassium carbonate-water phase by combining therewith the aforesaid water rich fraction, heating the adjusted potassium carbonate solution to a temperature of about 0 to 80° C. and recycling the heated solution to the extrusion zone.

References Cited in the file of this patent

UNITED STATES PATENTS

| 2,404,714 | Latham | July 23, 1946 |
|---|---|---|
| 2,404,717 | Houtz | July 23, 1946 |
| 2,544,385 | Hochwalt | Mar. 6, 1951 |
| 2,570,200 | Bruson | Oct. 9, 1951 |
| 2,570,237 | Hooper et al. | Oct. 9, 1951 |
| 2,570,257 | McFarren | Oct. 9, 1951 |
| 2,579,451 | Polson | Dec. 18, 1951 |
| 2,649,481 | Caldwell | Aug. 18, 1953 |